United States Patent
Bekircan et al.

(10) Patent No.: US 10,435,139 B2
(45) Date of Patent: Oct. 8, 2019

(54) GURNEY FLAP

(71) Applicant: Claverham Limited, Shirley, Solihull (GB)

(72) Inventors: Suat Bekircan, Bath (GB); Paul Brewer, Bristol (GB)

(73) Assignee: CLAVERHAM LTD., Bristol, Avon (GB)

( * ) Notice: Subject to any disclaimer, the term of this patent is extended or adjusted under 35 U.S.C. 154(b) by 252 days.

(21) Appl. No.: 15/475,346

(22) Filed: Mar. 31, 2017

(65) Prior Publication Data
US 2017/0355445 A1 Dec. 14, 2017

(30) Foreign Application Priority Data
Jun. 9, 2016 (EP) ..................................... 16173764

(51) Int. Cl.
*B64C 9/18* (2006.01)
*B64C 9/02* (2006.01)

(52) U.S. Cl.
CPC ............... *B64C 9/18* (2013.01); *B64C 9/02* (2013.01); *Y02T 50/32* (2013.01); *Y02T 50/44* (2013.01)

(58) Field of Classification Search
CPC .......... Y02T 50/44; Y02T 50/32; B64C 9/02; B64C 9/18; B64C 9/00; B64C 9/16; B64C 2009/005; B64C 9/14
See application file for complete search history.

(56) References Cited

U.S. PATENT DOCUMENTS

| | | | | |
|---|---|---|---|---|
| RE23,448 E | * | 12/1951 | Pullin | B64C 27/18 416/20 R |
| 5,518,210 A | * | 5/1996 | Friberg | B64C 3/50 244/215 |
| 2011/0220762 A1 | * | 9/2011 | Gyuricsko | B64C 9/22 244/99.3 |
| 2012/0261508 A1 | * | 10/2012 | Brewer | B64C 3/58 244/17.13 |
| 2012/0261519 A1 | * | 10/2012 | Brewer | B64C 3/50 244/215 |
| 2014/0102542 A1 | * | 4/2014 | Raghu | B64C 13/40 137/2 |

FOREIGN PATENT DOCUMENTS

| | | |
|---|---|---|
| EP | 2514667 A1 | 10/2012 |
| EP | 2514669 A1 | 10/2012 |

OTHER PUBLICATIONS

Extended European Search Report, European Search Report or the partial European Search Report/Declaraton of No Search and the European Search Opinion of International Application No. 16173764. 8, dated Dec. 12, 2016, 9 pages.

* cited by examiner

*Primary Examiner* — Assres H Woldemaryam
(74) *Attorney, Agent, or Firm* — Cantor Colburn LLP

(57) ABSTRACT

A gurney flap arrangement comprises: an airfoil with an opening in a surface of the airfoil; a gurney flap having a first position in which at least a portion of the gurney flap extends through the opening and projects outwardly from the airfoil surface, and a second position in which the gurney flap does not project from the airfoil surface or projects outwardly from the airfoil surface to a lesser extent; and a seal disposed about the opening to seal a gap in the opening between the gurney flap and the airfoil.

13 Claims, 4 Drawing Sheets

GURNEY FLAP

FOREIGN PRIORITY

This application claims priority to European Patent Application No. 16173764.8 filed Jun. 9, 2016, the entire contents of which is incorporated herein by reference.

The present invention relates to a gurney flap arrangement in which an airfoil includes a gurney flap, for example an airfoil for an aircraft.

Airfoils are used in many applications, typically to provide lift in a desired direction. A gurney flap, sometimes known as a wickerbill, is often used to improve the performance of the airfoil, and in its simplest form consists of a small tab projecting outwardly from the pressure side surface. Gurney flaps find particular use in applications where high amounts of lift are required, for example in a rotary wing aircraft such as a helicopter.

In order to control the amount of lift provided by the airfoils, some aircraft include deployable gurney flaps, which may be either stowed or deployed as needed. When deployed, the gurney flaps increase the lift provided by the airfoils, but increase their drag. The gurney flaps are stowed as needed to reduce drag. In some cases, the airfoil includes an opening into which the gurney flap can retract, thus withdrawing into the envelope of the airfoil. Such an opening necessarily provides ingress to particulates and atmospheric debris like dust, ice, water, insects etc., which in turn can cause wear fatigue, and degradation of the components.

According to a first aspect of the disclosure there is provided a gurney flap arrangement comprising: an airfoil with an opening in a surface of the airfoil; a gurney flap having a first position in which at least a portion of the gurney flap extends through the opening and projects outwardly from the airfoil surface, and a second position in which the gurney flap does not project from the airfoil surface or projects outwardly from the airfoil surface to a lesser extent; and a seal disposed about the opening to seal a gap in the opening between the gurney flap and the airfoil.

The airfoil may have any particular geometry suitable for its intended purpose. It may comprise a root portion, an intermediate portion, and a tip portion. It may comprise a pressure side, a suction side, a main spar, a leading edge, and a trailing edge. The opening may be nearer the trailing edge than the leading edge, and may be proximate the trailing edge. The opening may be in the pressure side surface of the airfoil.

The opening may have any geometry commensurate with the profile of the gurney flap, to allow the gurney flap to extend therethrough. The gurney flap may have an elongate shape. The length of the gurney flap may extend along at least a portion of the length of the span of the airfoil. The gurney flap can be considered as having a length in a direction that is generally parallel with the airfoil surface, for example along the span direction, and a width that is generally perpendicular to the airfoil surface, with the depth or thickness of the gurney flap being perpendicular to both the length and width directions. The gurney flap may be straight, or it may be curved along its length. The curve may be set based on the shape of the airfoil. Typically a gurney flap has a relatively large length and a relatively short width, with the thickness being smaller than the width, and also generally with the thickness being smaller than the extent to which the gurney flap projects outward from the airfoil surface in the first position. The opening may comprise a slot, wherein in the first position the gurney flap extends out of the slot, and wherein in the second position the gurney flap is withdrawn into the slot. The opening may be a constant width and may mimic the longitudinal shape of the airfoil and/or the shape of the gurney flap.

The gap between the gurney flap and the airfoil may surround some of or all of the gurney flap within the opening. The seal may bridge some of or all of the gap between the gurney flap and the airfoil. Therefore, the gurney flap may be disposed substantially within the centre of the opening, and the seal may be disposed about the gurney flap on all sides within the opening, thereby closing off the gap and sealing the inside of the airfoil from the outside environment.

In the second position, the gurney flap may be flush with an envelope of the airfoil (for example, flush with the surface of the airfoil), thereby reducing its drag as compared to that of the first position. The seal may also be flush with the envelope of the airfoil, or at least may not extend outward of the envelope of the airfoil. In the second position, the gurney flap may be entirely within the envelope of the airfoil. In the first position, the gurney flap may extend from the pressure side of the airfoil by a distance of 1% to 2% of the chord length. In the first position the portion of the gurney flap that extends outward of the airfoil surface may extend perpendicular or about perpendicular to the airfoil surface, for example within 10° of a normal to the airfoil surface. In the first position, the gurney flap may be substantially within the airfoil, such that only a portion of its total length projects from the pressure side surface. Alternatively, in the first position, the gurney flap may be substantially outside the airfoil, such that only a portion of its length remains within the airfoil. The gurney flap may not change orientation, and may only translate as it changes position between the first and second positions. That is, the gurney flap's orientation may be the same in both first and second positions.

The seal may comprise a seal body made of a resilient material such as a rubber or plastic material. The seal body made of a single homogeneous material. That is, the seal body may have a uniform composition throughout. Alternatively a composite material may be used. The seal body may comprise a self-lubricating material, such as polytetrafluoroethylene (PTFE), graphite, or molybdenum di-sulphide. Flexible metal materials may be used in the seal body, optionally in conjunction with a rubber or plastic material. The seal body may be sufficiently flexible and durable to withstand the atmosphere experienced by the airfoil during use. The seal body may be flexible enough to deform as desired when the gurney flap is in first and second position, and to return to a relaxed state when needed.

The seal body may comprise a scraper lip in contact with the gurney flap and configured to bear against a side of the gurney flap during transition of the gurney flap between first and second positions. The gurney flap may therefore move relative to the scraper lip such that the scraper lip slides along its length. The scraper lip may serve to clean debris off the side of the gurney flap as it moves to transition from the first position to the second position, thereby sliding past the scraper lip. The seal body may comprise one, two, three, or four scraper lips bearing against one, two, three, or four sides of the gurney flap.

The seal may comprise a biasing means to urge the seal body to bear against the gurney flap, thereby ensuring sufficient sealing of the interior space of the airfoil from the external environment. The biasing means may serve to bias the scraper lip(s) against the gurney flap for cleaning debris off it during stowing (i.e. during transition from the first position to the second position). The biasing means may be a spring embedded within the seal body, or any other suitable resilient formation. Alternatively, the biasing means may be an inherent property of the seal body, which may therefore be elastic and resilient enough to bear against the gurney flap with sufficient force to provide an acceptable seal.

The seal may comprise a slot, for example a slot extending through the seal body, and in the first position the gurney flap may extend out of the slot, and in the second position the gurney flap may be withdrawn into the slot. When the gurney flap is stowed (i.e. in the second position) its outermost end surface may be flush with the outermost surface of the seal, both of which surfaces may be flush with the pressure side surface of the airfoil. The seal may curve outwards from the surface of the airfoil so that gurney flap may be easily actuated outward, and so that the scraper surfaces are angled in contact with the gurney flap and are hence better positioned to scrape debris from the sides as the gurney flap is retracted to the second position. Alternatively, the scraper lip(s) may meet the side of the gurney flap at right angles.

The seal may comprise a cap section fixed or bonded to an end of the gurney flap. The cap section may therefore provide the aerodynamic function of the gurney flap. The seal body may comprise a fold section connecting the cap section to the airfoil, wherein in the first position the fold section may define a surface curving out from the airfoil towards the cap section and the end of the gurney flap, and wherein in the second position the fold section may retract into the airfoil. The fold section may be connected to the cap section on all sides, may surround the gurney flap on all sides, and may be connected to the perimeter of the opening on all sides. That is, the seal may completely cover the opening and may fully enclose the gurney flap. The cap section and seal body may be formed together in a single moulding. The fold section may provide slack in the seal so that it can be raised from the surface of the airfoil by the gurney flap in the deployed (first) position. The seal itself then provides the aerodynamic surface of the gurney flap, with the moveable gurney flap providing structural support. With this arrangement, when the gurney flap moves to the stowed (second) position, the fold section slackens and withdraws into the airfoil together with the gurney flap. The interior of the airfoil may therefore be completely sealed from the external atmosphere.

The gurney flap arrangement of some examples may comprise any combination of the above features, for example a scraper lip disposed on one side of the gurney flap, together with a cap portion connected to a fold portion on the other side of the gurney flap. The seal may comprise a slot thorough which the gurney flap passes, with a fold portion connecting the edges of the slot to a cap portion, such that the gurney flap is sheathed in a portion of the seal in the first position, and such that the resulting aerodynamic surface has approximately a right angle between the portion of the seal covering the gap and the portion of the seal sheathing the gurney flap.

The airfoil may be a rotor blade of a rotary wing aircraft, and may be one of a plurality of rotor blades mounted to a rotor hub. The airfoil may be a wing of an aircraft, or may be on a spoiler of a vehicle. The arrangement may comprise an actuation means to actuate the gurney flap between the first and second positions.

According to a second aspect of the disclosure there is provided a method of manufacturing a gurney flap arrangement comprising: an airfoil, a gurney flap, and a seal; the method comprising: providing an opening in the airfoil; arranging the gurney flap so that it has a first position in which at least a portion extends through the opening and projects from the airfoil, and a second position in which the gurney flap does not project from the airfoil; positioning the seal about the opening to seal a gap in the opening between the gurney flap and the airfoil.

The method may comprise manufacturing a gurney flap according to any of the embodiments described above with respect to the first aspect. Thus, the method may include providing any or all of the features described above.

An exemplary embodiment of the present disclosure will now be described by way of example only and with reference to the accompanying drawings in which.

Figure 1:
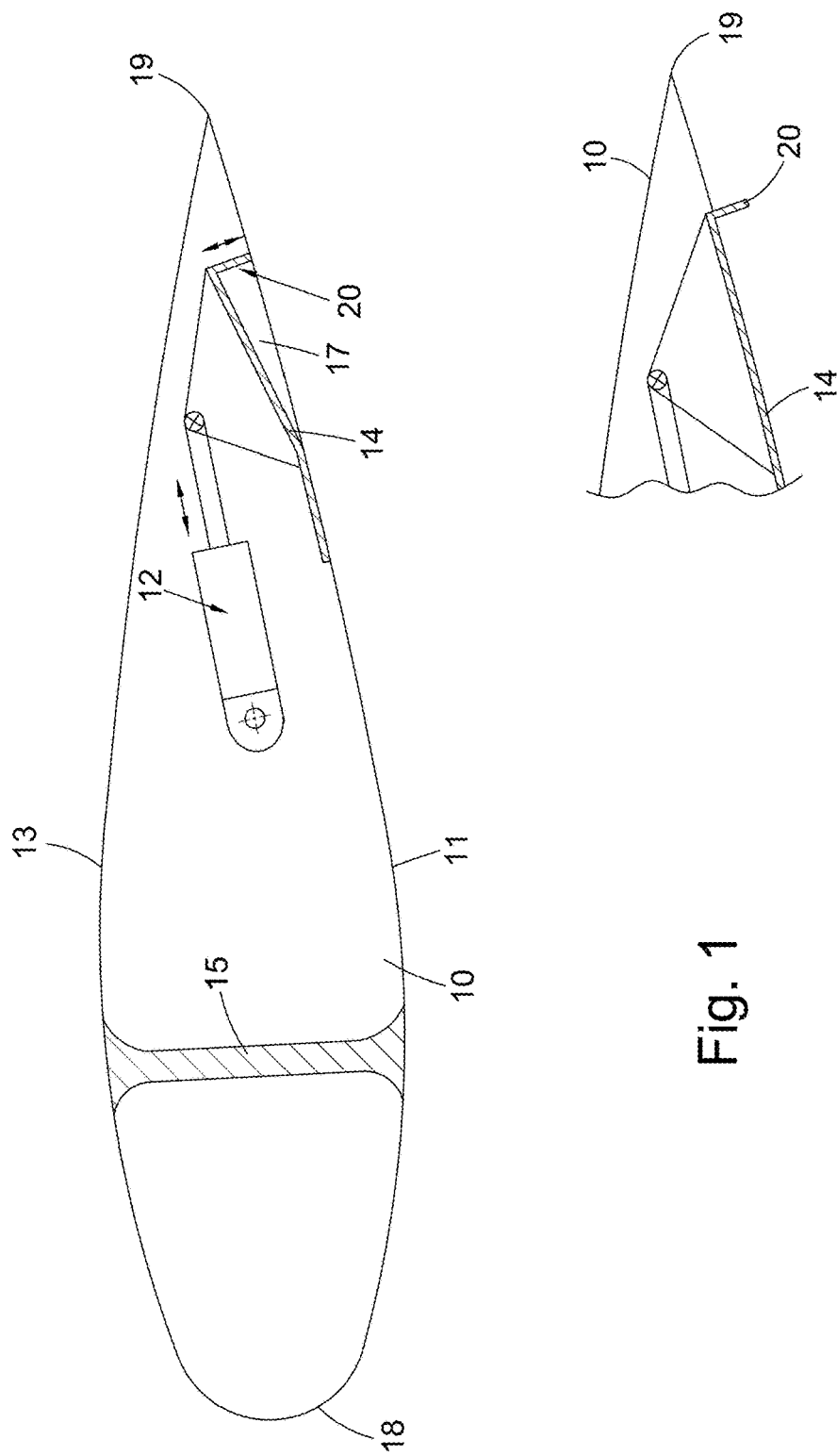
FIG. 1 shows an exemplary airfoil with a gurney flap.

FIG. 1 shows a gurney flap arrangement comprising an airfoil 10, an actuator 12, a flexible member 14, an opening 17, and a gurney flap 20. FIG. 1 shows the gurney flap 20 in a first, stowed position, and the insert shows the gurney flap 20 in a second, deployed position. The opening 17 can be clearly seen in FIG. 1, and permits ingress of atmospheric debris (dust, ice, and water etc.) into the airfoil structural cavity during the gurney flap operation.

The airfoil 10 is a main rotor blade of a rotary wing aircraft mounted to a rotor hub. The airfoil 10 has a pressure side 11, a suction side 13, a main spar 15, a leading edge 18, and a trailing edge 19. The gurney flap 20 is deployed to increase the rotor blade lift during blade rotation. The gurney flap 20 is retracted during other parts of blade rotation to decrease drag.

Figure 2:
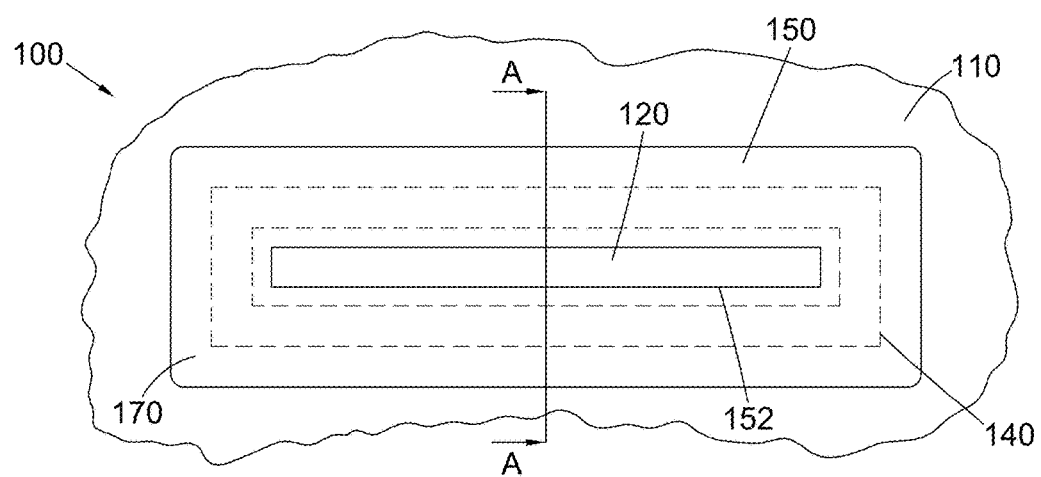
FIG. 2 shows a view of a gurney flap arrangement.

FIG. 2 shows a gurney flap arrangement 100 disposed on the pressure side of an airfoil 110 near the trailing edge. The gurney flap 120 has rectangular cross-section with rounded corners disposed approximately in the centre of an opening 170 formed in the airfoil 110. A seal 150 is disposed within the opening 170 in the airfoil 110 and surrounds the gurney flap 120, bridging and covering a gap between the gurney flap 120 and the edge of the opening 170. The seal 150 is flexible and has a slot (e.g. an elongate letterbox shaped hole) through which the gurney flap 120 passes. The edge of the slot of the seal 150 defines a scraper lip 152, which is urged into contact with the gurney flap 120 by spring 140 (shown in dashed outline in FIG. 2).

Figure 3A:
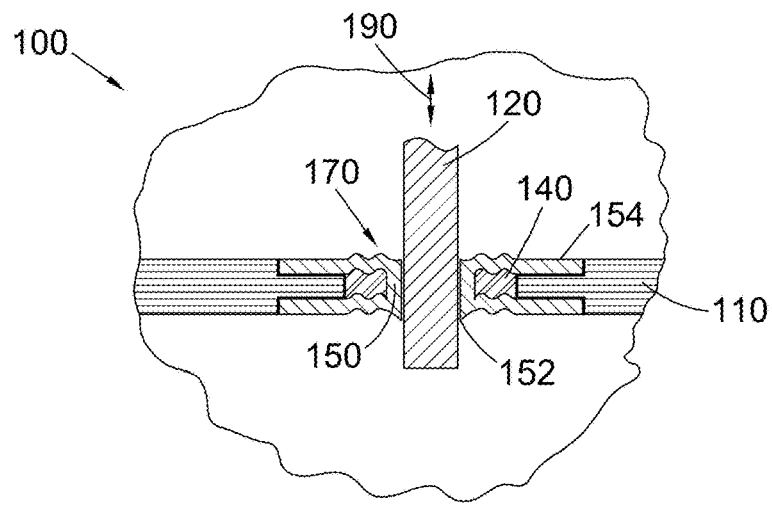
FIG. 3A shows a section view of the arrangement of FIG. 2 with the gurney flap in a first position.

FIG. 3A shows the view of section A-A of FIG. 2. The seal 150 is bonded on to the structure of the airfoil 110 around the edge of the opening 170 at bonding portions 154. The gurney flap 120 is shown in the first (deployed) position and hence extends through the slot in the seal 150 and projects from the surface of the airfoil 110. In the first position the gurney flap 120 increases the lift of the airfoil 110. The seal 150 has an overall outward curvature (albeit a small curvature) so that the scraper lips 152 meet the gurney flap 120 at an angle. The scraper lips 152 continuously contact the sides and edges (not shown in FIG. 3A) of the gurney flap 120, biased by the spring 140 disposed within the opening 170 and within the seal 150, positioned against the edge of the opening 170 in the airfoil 110. The seal 150 is energised continuously by the spring 140 (or any other suitable elastomeric or metallic spring energisers).

Figure 3B:
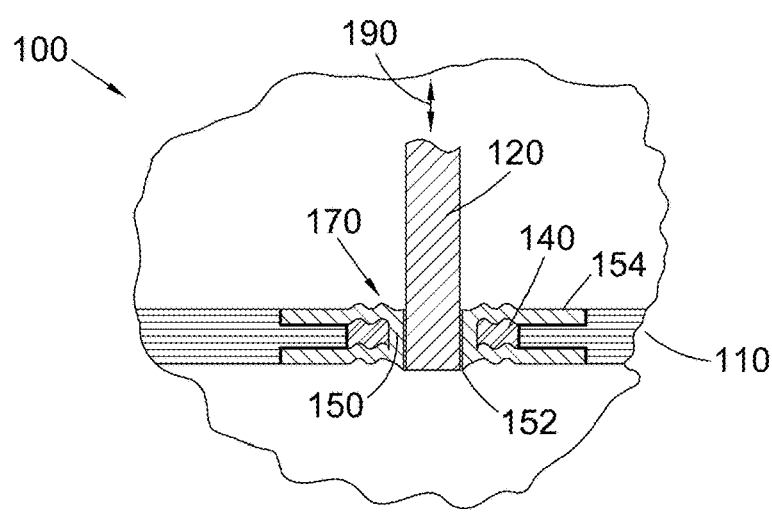
FIG. 3B shows a section view of the arrangement of FIGS. 2 and 3A with the gurney flap in a second position.

The gurney flap 120 is moved (e.g. by an actuator) in the directions indicated by arrow 190. FIG. 3B shows the gurney flap 120 in the second (stowed) position. As the gurney flap 120 is withdrawn into the interior of the airfoil 110, it slides past scraper lips 152, which clean off any accumulated debris. Thus, not only does the seal prevent ingress of atmospheric debris by sealing the gap in the opening 170, but the scraper lips 152 ensure that no debris is transported into the airfoil 110 when the gurney flap 120 is stowed.

In the second position, the end of the gurney flap 120 is flush with the outer surface of the airfoil 110. The gurney flap 120 may be withdrawn so that the seal 150 is flush with the pressure side surface of the airfoil 110.

The seal 150 may be made of self-lubricated material such as PTFE, graphite, molybdenum di-sulphide or any other suitable self-lubricated elastomeric material. The gurney flap 120 may be made of metallic materials or non-metallic composite materials. The contact surfaces of the gurney flap 120 may also be coated, for example with graphite or tungsten carbide to provide high wear resistance and self-lubrication.

Figure 4A:
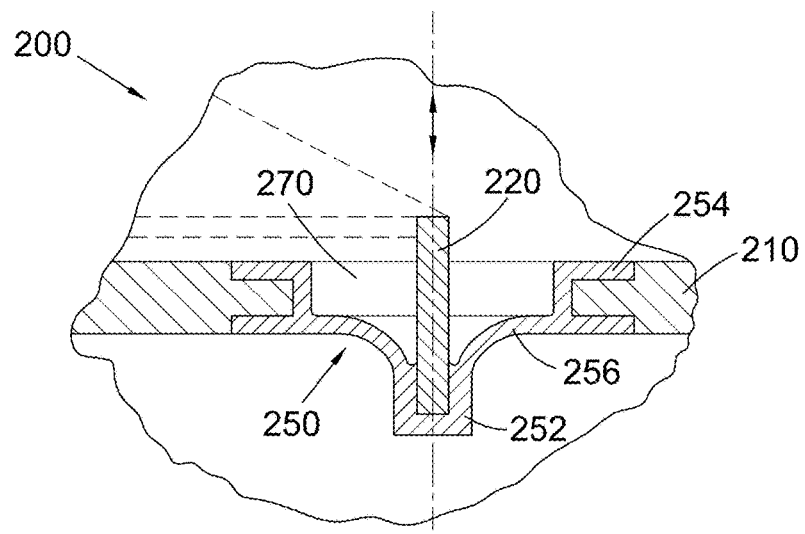
FIG. 4A shows a section view of an alternative arrangement with a gurney flap in a first position.

FIG. 4A shows an alternative gurney flap arrangement 200. A cross-section through the arrangement is shown when the gurney flap 220 is deployed in the first position. The seal 250 is bonded to the airfoil 210 at bonding portions 254 and is also bonded to the end of the gurney flap 220 at cap portion 252. Fold portions 256 connect the cap portion 252 to the bonding portions 254, and hence the depicted arrangement fully seals the inside of the airfoil 210 from atmospheric media whilst allowing the gurney flap 220 to deploy and retract.

The opening 270 in the airfoil 210 is clearly visible in FIG. 4A, with the gurney flap 220 disposed approximately in the centre. The fold sections 256 curve outward from the bonding sections 254 at the edge of the opening 270 to connect to the cap section 252 at the end of the gurney flap 220. Therefore, the seal 250 itself provides the aerodynamic surface of the gurney flap 220, with the gurney flap 220 providing the required support.

Figure 4B:
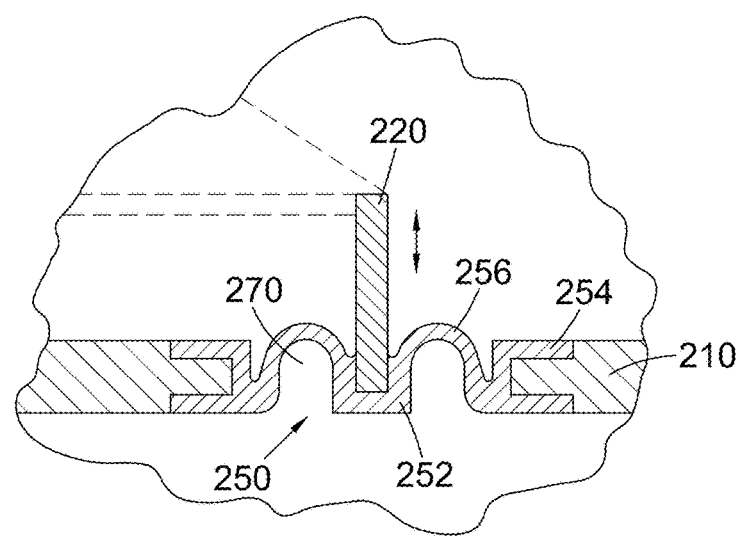
FIG. 4B shows a section view of the alternative arrangement of FIG. 4A with the gurney flap in a second position.

FIG. 4B depicts the gurney flap arrangement 200 of FIG. 4A with the gurney flap 220 in the second (stowed) position. When the gurney flap 220 is fully retracted into the interior of the airfoil 210, the cap section 252 of the seal 250 is flush with the outer surface of the airfoil 210. The fold sections 256 are folded back into the interior of the airfoil 210, and parts of the opening 270 are thus external to the seal arrangement. Those regions may be sized such that they are not detrimental to the overall aerodynamics of the airfoil.

The gurney flap arrangements 100, 200 described herein and depicted in the figures may be used to prevent the ingress of atmospheric debris into an airfoil during use of a gurney flap. They provide a simple, robust design for a sealing system for a gurney flap which improves seal integrity and reliability. The arrangements provide complete seals for isolating the atmospheric side of the airfoil from the interior. Due to their simplicity and robustness, the arrangements can be used in high g-force environments, for example at 700g. Finally, the moulded seal structure with bonding provides a minimum space envelope and weight reduction, as well as a minimum number of moving parts.

While the arrangements have been shown and described with reference to exemplary embodiments, those skilled in the art will appreciate that changes and/or modifications may be made thereto without departing from the scope of the present disclosure as defined by the appended claims.

The invention claimed is:

1. A gurney flap arrangement comprising:
an airfoil with an opening in a surface of the airfoil;
a gurney flap having a first position in which at least a portion of the gurney flap extends through the opening and projects outwardly from the airfoil surface, and a second position in which the gurney flap does not project from the airfoil surface or projects outwardly from the airfoil surface to a lesser extent; and
a seal disposed about the opening to seal a gap in the opening between the gurney flap and the airfoil;
wherein the seal comprises a cap section fixed to an end of the gurney flap; and
wherein the seal comprises a fold section connecting the cap section to the airfoil, wherein in the first position the fold section defines a surface curving out from the airfoil towards the end of the gurney flap, and wherein in the second position the fold section retracts into the airfoil.

2. The gurney flap arrangement as claimed in claim 1, wherein the opening comprises a slot, wherein in the first position the gurney flap extends out of the slot, and wherein in the second position the gurney flap is withdrawn into the slot.

3. The gurney flap arrangement as claimed in claim 1, wherein the gap between the gurney flap and the airfoil surrounds the gurney flap within the opening, and the seal bridges the gap between the gurney flap and the airfoil.

4. The gurney flap arrangement as claimed in claim 1, wherein in the second position the gurney flap is flush with an envelope of the airfoil.

5. The gurney flap arrangement as claimed in claim 1, wherein the seal comprises a seal body.

6. The gurney flap arrangement as claimed in claim 5, wherein the seal body comprises self-lubricating material, preferably wherein the seal body comprises, graphite, or molybdenum di-sulphide.

7. The gurney flap arrangement as claimed in claim 5, wherein the seal body comprises a scraper lip in contact with the gurney flap and configured to bear against a side of the gurney flap during transition of the gurney flap between first and second positions.

8. The gurney flap arrangement as claimed in claim 5, wherein the seal comprises biasing means to urge the seal body to bear against the gurney flap.

9. The gurney flap arrangement as claimed in claim 1 wherein the seal comprises a slot, and wherein in the first position the gurney flap extends out of the slot, and in the second position the gurney flap is withdrawn into the slot.

10. The gurney flap arrangement as claimed in claim 1, wherein the seal completely covers the opening and fully encloses the gurney flap.

11. The gurney flap arrangement as claimed in claim 5, wherein the seal body is made of a single homogeneous material.

12. The gurney flap arrangement as claimed in claim 6, wherein the self-lubricating material is one of: polytetrafluoroethylene; graphite; and molybdenum di-sulphide.

13. The gurney flap arrangement as claimed in claim 5, wherein the seal comprises biasing means to urge the scraper lip to bear against the gurney flap.

* * * * *